US011783029B2

(12) United States Patent
Yang et al.

(10) Patent No.: US 11,783,029 B2
(45) Date of Patent: *Oct. 10, 2023

(54) METHODS AND APPARATUS TO IMPROVE FEATURE ENGINEERING EFFICIENCY WITH METADATA UNIT OPERATIONS

(71) Applicant: Intel Corporation, Santa Clara, CA (US)

(72) Inventors: Chih-Yuan Yang, Portland, OR (US); Yi Gai, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 82 days.

This patent is subject to a terminal disclaimer.

(21) Appl. No.: 17/140,797

(22) Filed: Jan. 4, 2021

(65) Prior Publication Data

US 2021/0200863 A1 Jul. 1, 2021

Related U.S. Application Data

(63) Continuation of application No. 16/805,159, filed on Feb. 28, 2020, now Pat. No. 10,915,627, which is a
(Continued)

(51) Int. Cl.
*G06F 21/55* (2013.01)
*G06F 21/52* (2013.01)
(Continued)

(52) U.S. Cl.
CPC .......... *G06F 21/552* (2013.01); *G06F 21/52* (2013.01); *G06N 20/10* (2019.01); *G06N 20/00* (2019.01)

(58) Field of Classification Search
CPC ...... G06F 21/56; G06F 21/565; G06F 21/552; G06F 21/566; G06F 2221/034;
(Continued)

(56) References Cited

U.S. PATENT DOCUMENTS 7,712,137 B2 * 5/2010 Meier ................. H04L 63/1433
726/25
7,797,743 B2 * 9/2010 Treacy .................. G06F 21/566
726/28
(Continued)

OTHER PUBLICATIONS

Evans, "Big Data Storage: Hadoop Storage Basics," Computer Weekly, retrieved from <https://www.computerweekly.com/feature/Big-data-storage-Hadoop-storage-basics>, retrieved on Mar. 7, 2016, published Oct. 21, 2013, 5 pages.
(Continued)

*Primary Examiner* — Lizbeth Torres-Diaz
(74) *Attorney, Agent, or Firm* — HANLEY, FLIGHT & ZIMMERMAN, LLC

(57) ABSTRACT

Methods, apparatus, systems and articles of manufacture are disclosed to improve feature engineering efficiency. An example method disclosed herein includes retrieving a log file in a first file format, the log file containing feature occurrence data, generating a first unit operation based on the first file format to extract the feature occurrence data from the log file to a string, the first unit operation associated with a first metadata tag, generating second unit operations to identify respective features from the feature occurrence data, the second unit operations associated with respective second metadata tags, and generating a first sequence of the first metadata tag and the second metadata tags to create a first vector output file of the feature occurrence data.

21 Claims, 9 Drawing Sheets

Related U.S. Application Data continuation of application No. 15/280,044, filed on Sep. 29, 2016, now Pat. No. 10,607,004.

(51) Int. Cl.
*G06N 20/00* (2019.01)
*G06N 20/10* (2019.01)

(58) Field of Classification Search
CPC .... G06F 18/213; G06F 21/121; G06F 21/554; G06F 21/577; H04L 63/145; H04L 63/1433; H04L 63/20; H04L 63/1475; H04L 63/1466; H04L 63/1491; H04W 12/122
USPC ........................................................ 713/188
See application file for complete search history.

(56) References Cited

U.S. PATENT DOCUMENTS

| | | | | |
|---|---|---|---|---|
| 8,463,591 | B1* | 6/2013 | Chang | G06F 40/211 704/9 |
| 9,203,854 | B2* | 12/2015 | Friedrichs | G06F 21/564 |
| 9,672,355 | B2* | 6/2017 | Titonis | H04W 12/12 |
| 10,388,272 | B1* | 8/2019 | Thomson | G10L 15/22 |
| 10,607,004 | B2* | 3/2020 | Yang | G06F 21/52 |
| 10,621,314 | B2* | 4/2020 | Fox | G06F 8/60 |
| 10,915,627 | B2* | 2/2021 | Yang | G06F 21/52 |
| 11,019,088 | B2* | 5/2021 | Pratt | H04L 63/1416 |
| 2009/0210364 | A1* | 8/2009 | Adi | G06N 5/025 706/59 |
| 2009/0300761 | A1* | 12/2009 | Park | G06F 21/562 707/999.102 |
| 2013/0282630 | A1* | 10/2013 | Attenberg | G06N 20/00 706/12 |
| 2014/0090061 | A1 | 3/2014 | Avasarala et al. | |
| 2014/0165203 | A1* | 6/2014 | Friedrichs | G06F 21/552 726/24 |
| 2015/0007312 | A1* | 1/2015 | Pidathala | H04L 63/1433 726/22 |
| 2015/0026810 | A1* | 1/2015 | Friedrichs | G06F 21/564 726/23 |
| 2015/0220733 | A1* | 8/2015 | Moon | G06F 21/552 726/23 |
| 2015/0269495 | A1* | 9/2015 | Dalessandro | G06N 20/00 706/12 |
| 2015/0381637 | A1* | 12/2015 | Raff | H04L 63/0218 726/23 |
| 2016/0203318 | A1* | 7/2016 | Avasarala | G06F 21/566 726/23 |
| 2017/0098074 | A1* | 4/2017 | Okano | G06N 20/00 |
| 2017/0214701 | A1* | 7/2017 | Hasan | H04L 63/1491 |
| 2018/0013772 | A1* | 1/2018 | Schmidtler | H04L 63/145 |
| 2018/0089424 | A1* | 3/2018 | Yang | G06F 21/552 |
| 2018/0183815 | A1* | 6/2018 | Enfinger | H04L 63/145 |
| 2019/0163904 | A1* | 5/2019 | Chung | G06N 3/045 |
| 2019/0260779 | A1* | 8/2019 | Bazalgette | H04L 41/22 |
| 2020/0344251 | A1* | 10/2020 | Jeyakumar | G06F 16/951 |
| 2020/0372151 | A1* | 11/2020 | Yang | G06F 21/52 |
| 2021/0084059 | A1* | 3/2021 | Sun | G06F 16/9024 |
| 2021/0256127 | A1* | 8/2021 | Miserendino | G06F 21/56 |
| 2021/0258791 | A1* | 8/2021 | Jochem Sanz | H04W 12/66 |
| 2022/0121429 | A1* | 4/2022 | Haile | G06N 3/08 |
| 2022/0131890 | A1* | 4/2022 | Shukla | G06F 21/552 |
| 2023/0009831 | A1* | 1/2023 | Troxell | A61B 34/20 |
| 2023/0146636 | A1* | 5/2023 | Kim | G06F 21/554 726/23 |

OTHER PUBLICATIONS

Wikipedia, "Feature Engineering," last modified Jul. 14, 2016, retrieved from [https://en.wikipedia.org/w/index.php?title=Feature_engineering&oldid=729819587], 3 pages.

Wikipedia, "n-gram," last modified Jul. 30, 2016, retrieved from [https://en.wikipedia.org/w/index.php?title=N-gram&oldid=732244878], 8 pages.

Wikipedia, "Regular Expression," last modified Jul. 25, 2016, retrieved from [https://en.wikipedia.org/w/index.php?title=Regular_expression&oldid=731468706], 15 pages.

International Searching Authority, "Search Report," issued in connection with PCT patent application No. PCT/US2017/047164, dated Nov. 15, 2017, 5 pages.

International Searching Authority, "Written Opinion," issued in connection with PCT patent application No. PCT/US2017/047164, dated Nov. 15, 2017, 6 pages.

Regular-Expressions.info, "Welcome to Regular-Expressions.info, the Premier Website about Regular Expressions," last modified May 30, 2016, retrieved from [http://www.regular-expressions.info], 2 pages.

Ganesan, Kavita, "Text Mining, Analytics & More: What are N-Grams?," RxNLP 2016, retrieved from [http://text-analytics101.rxnlp.com/2014/11/what-are-n-grams.html], 2 pages.

United States Patent and Trademark Office, "Non-Final Office Action", issued in connection with U.S. Appl. No. 15/280,044, dated Sep. 24, 2018, 15 pages.

United States Patent and Trademark Office, "Final Office Action", issued in connection with U.S. Appl. No. 15/280,044, dated May 8, 2019, 12 pages.

United States Patent and Trademark Office, "Notice of Allowance and Fee(s) Due", issued in connection with U.S. Appl. No. 15/280,044, dated Nov. 14, 2019, 18 pages.

United States Patent and Trademark Office, "Notice of Allowance and Fee(s) Due", issued in connection with U.S. Appl. No. 16/805,159, dated Oct. 5, 2020, 10 pages.

* cited by examiner

200 ↘

Input type 1: (log for one sample from Android program)
```
android.os.SystemProperties.get         ⎫
android.os.SystemProperties.get         ⎪
android.os.SystemProperties.get         ⎬ 202
android.os.SystemProperties.get         ⎪
android.os.SystemProperties.get         ⎪
android.os.SystemProperties.get         ⎭     ╱─ 204
android.telephony.TelephonyManager.getDeviceId
android.os.SystemProperties.get
android.telephony.TelephonyManager.getSimOperator
android.os.SystemProperties.get
java.net.Socket.getInputStream
java.net.Socket.getOutputStream
android.os.SystemProperties.get
android.os.SystemProperties.get
android.os.SystemProperties.get
android.os.SystemProperties.get
android.os.SystemProperties.get
android.telephony.TelephonyManager.getDeviceId
android.os.SystemProperties.get
android.telephony.TelephonyManager.getSimOperator
android.os.SystemProperties.get
org.apache.http.impl.client.AbstractHttpClient.execute
org.apache.http.impl.client.AbstractHttpClient.execute
org.apache.http.impl.client.AbstractHttpClient.execute
android.app.SharedPreferencesImpl$EditorImpl.putString
android.app.SharedPreferencesImpl$EditorImpl.putLong
libcore.io.IoBridge.open
java.net.Socket.getInputStream
java.net.Socket.getOutputStream
java.net.Socket.getInputStream
java.net.Socket.getOutputStream
org.apache.http.impl.client.AbstractHttpClient.execute
```

Input type 2: (log for one sample from Windows program)
```
Sleep:40115E (A)
VirtualAlloc:42A51D (0,30600,1000,40) ret:1A0000,,,,
VirtualAlloc:1A02BA (0,30000,1000,40) ret:1E0000,,,,
VirtualFree:1A0382 (1E0000,21800,4000) ret:1,,,,
VirtualProtect:1A03A8 (400000,30000,40,6FF9C)
GetProcAddress:1A04A0 (7C7F0000,"Thread32Next")
GetProcAddress:1A04A0 (7C7F0000,"ReadFile")
GetProcAddress:1A04A0 (7C7F0000,"GetTimeZoneInformation")
GetProcAddress:1A04A0 (7C7F0000,"MultiByteToWideChar")
GetProcAddress:1A04A0 (7C7F0000,"FlushFileBuffers")
GetProcAddress:1A04A0 (7C7F0000,"GetTempPathW")
GetProcAddress:1A04A0 (7C7F0000,"GetFileSizeEx")
GetProcAddress:1A04A0 (7C7F0000,"OpenMutexW")
GetProcAddress:1A04A0 (7C7F0000,"SetLastError")
HeapCreate:40C230 ()
WSAStartup:40C280 ()
CreateFileW:4051EF ("C:\popupkiller.exe",0,3,,3,0,0)
ret:FFFFFFFF,,,,
CreateFileW:4051EF ("C:\TOOLS\execute.exe",0,3,,3,0,0)
ret:FFFFFFFF,,,,
LoadLibraryW:40527F ("SbieDll.dll") ret:0,,,,
CreateMutexW:405238 (,0,"Frz_State") ret:67C,,,,
CloseHandle:405253 (67C) ret:1,,,,
CreateFileW:4051EF ("\\.\NPF_NdisWanIp",0,3,,3,0,0)
ret:FFFFFFFF,,,,
CreateFileW:4051EF ("\\.\HGFS",0,3,,3,0,0)
ret:FFFFFFFF,,,,
```

254 — (pointing to API names)
252 — (bracket grouping GetProcAddress calls)
256 — (pointing to CreateFileW paths)

FIG. 2B

METHODS AND APPARATUS TO IMPROVE FEATURE ENGINEERING EFFICIENCY WITH METADATA UNIT OPERATIONS

RELATED APPLICATION

This patent arises from a continuation of U.S. patent application Ser. No. 16/805,159, (Now U.S. Pat. No. 10,915,627) which was filed on Feb. 28, 2020 and is a continuation of U.S. patent application Ser. No. 15/280,044, (Now U.S. Pat. No. 10,607,004) which was filed on Sep. 29, 2016. U.S. patent application Ser. No. 16/805,159 and U.S. patent application Ser. No. 15/280,044 are hereby incorporated by reference in their entireties. Priority to U.S. patent application Ser. No. 16/805,159 and U.S. patent application Ser. No. 15/280,044 is hereby claimed.

FIELD OF THE DISCLOSURE

This disclosure relates generally to malware detection, and, more particularly, methods and apparatus to improve feature engineering efficiency with metadata unit operations.

BACKGROUND

In recent years, malware analysis entities have enjoyed access to behavior data from computing devices so that behavior log files may be generated. Malware analysis entities include businesses that study behaviors of programs that execute on devices, such as network access attempts and/or other device function invocations. In some examples, the malware analysis entities apply behavior log files to one or more machine learning systems so that predictive patterns may be identified in an effort to prevent malware operations before such malware can cause damage and/or propagate further within one or more computing devices.

BRIEF DESCRIPTION OF THE DRAWINGS

FIGS. 2A and 2B are example text log input file formats generated by behavior aggregators that are processed by the example computing environment of FIG. 1.

DETAILED DESCRIPTION

Malware analysis entities include organizations that design software and/or hardware applications to protect computing devices and/or networks from malicious threats. In some examples, the malware analysis entities distribute virus and/or malware detection and containment applications to be installed on client devices that detect suspicious data, files and/or behaviors before causing damage to the computing device. Additionally, the malware analysis entities may employ "sandboxing" techniques by running malware or suspected malware on a dedicated set of hardware or in a virtual machine/emulator. As such, any "dirty" actions are confined in a safe manner. The malware analysis entities may also collect behavior information of the devices under their monitoring purview, regardless of whether that behavior information includes malicious or non-malicious behavior data. In particular, the malware analysis entities utilize both malicious behavior data and non-malicious behavior data to facilitate feature engineering (e.g., with the aid of machine learning). Generally speaking, feature engineering collects feature data (e.g., features may include, but are not limited to opening network connections, opening input/output (I/O) bridges, registry access attempts, system property access attempts, program execution attempts, invoking libraries, etc.) that is used as input to modeling activities for machine learning algorithms, in which output from the machine learning process may reveal trends, signals, and/or sequences that aid in early malware detection. Feature data may include any type of information, such as computing behavior data, which may aid in the ability to make predictions.

Figure 1:
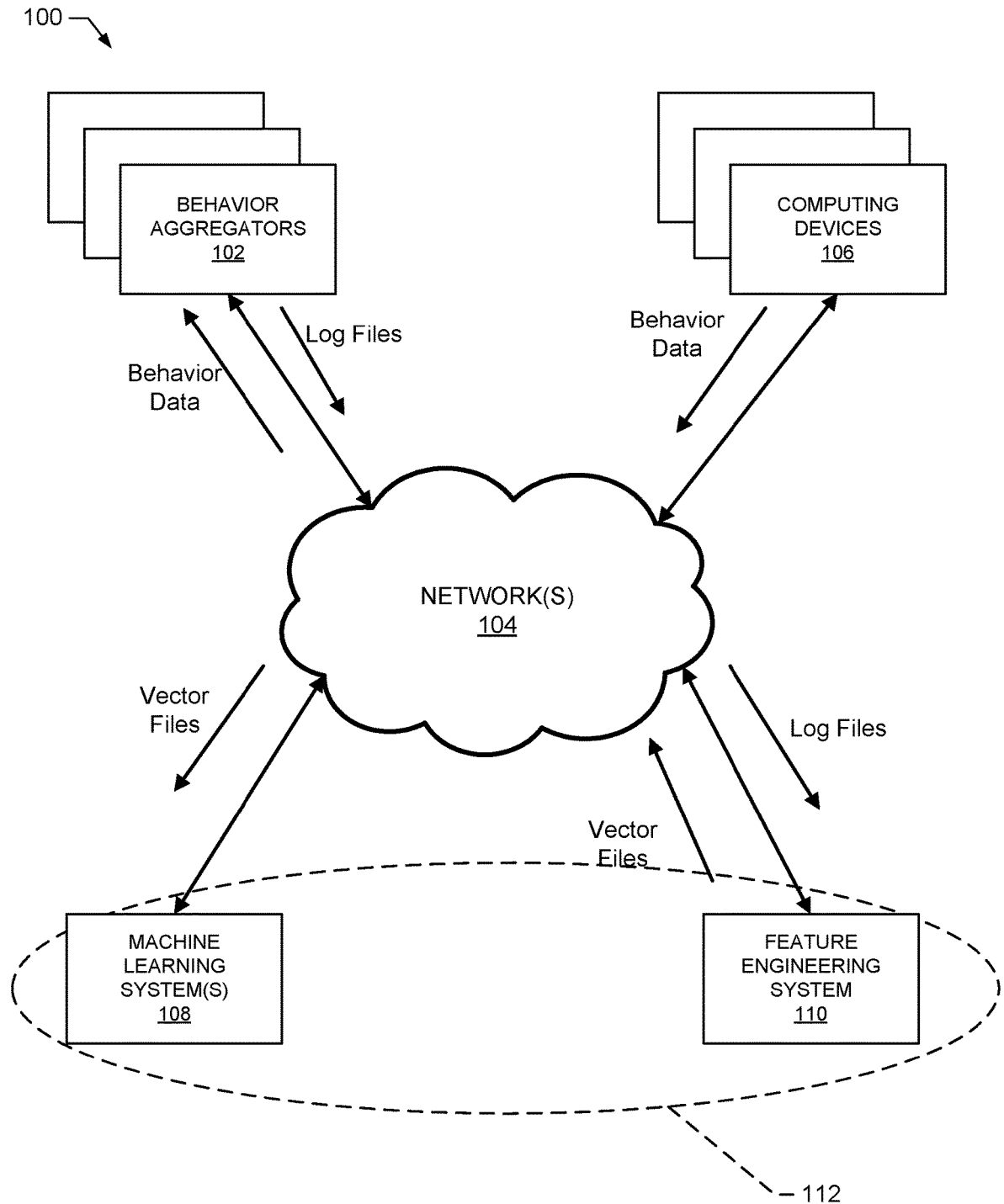
FIG. 1 is a schematic illustration of an example computing environment constructed in accordance with the teachings of this disclosure to improve feature engineering efficiency with metadata unit operations.

FIG. 1 is a schematic illustration of an example computing environment 100 to improve feature engineering efficiency. In the illustrated example of FIG. 1, the environment 100 includes one or more behavior aggregators 102, such as malware analysis entities (e.g., security sandboxes, such as McAfee® Advanced Threat Defense, FireEye® Forensic Analysis Platform, Mandiant®, etc.). The example behavior aggregators 102 are communicatively connected to one or more network(s) 104, such as local area networks (LANs), wide area networks (WANs), the Internet, etc. As described above, hardware and/or software applications developed by the behavior aggregators 102 in the form of virus and/or malware protection may be installed and/or otherwise associated with one or more computing devices 106. The example computing devices 106 are communicatively connected to the example network 104 and may include personal computers (PCs), servers, mainframes, tablet devices, wireless telephones and/or other networked computing devices.

Behavior data associated with the example computing devices 106 of FIG. 1 is retrieved and/or otherwise received by the example behavior aggregators 102. Based on the identified behaviors, the example behavior aggregators generate log files that identify features that occur when respective programs execute on the example computing devices 106. FIG. 2A illustrates an example input from an Android® program that was generated by an example behavior aggregator 102 as a text log 200. In the illustrated example of FIG. 2A, the text log 200 includes a list of chronologically/sequentially occurring features (events) associated with the program (e.g., an Android® program) that executed on the device. For example, the feature "android.os.SystemProperties.get" occurred six (6) times (202), followed by the feature "android.telephony.TelephonyManager.getDeviceId" (204). Generally speaking, feature occurrences may include any number of different permutations that appear in different degrees of frequency and/or order. Some occurrences may be innocuous, while others may be indicative of a threat (e.g., virus, malware, etc.).

FIG. 2B illustrates an alternate example input from a Windows® program that was generated by an example behavior aggregator 102 as a text log 250. In the illustrated example of FIG. 2B, the text log 250 includes some differences from the example text log 200 of FIG. 2A. In particular, the example text log 250 of FIG. 2B includes a list of chronologically/sequentially occurring features associated with a Windows® that executed on the device, in which the features include nomenclature that is different from the illustrated example of FIG. 2A. Additionally, the example features of the text log 250 of FIG. 2B include example procedure names surrounded by quotation marks 252, in-line names of executables surrounded by quotation marks 254 and library nomenclature 256 (e.g., "SbieDll.dll"). While the illustrated examples of FIGS. 2A and 2B include logs as text files, examples disclosed herein are not limited thereto. Example log files may be in any other format such as, for example JavaScript Object Notation (JSON), binary, Extensible Markup Language (XML), etc.

Figure 2C:
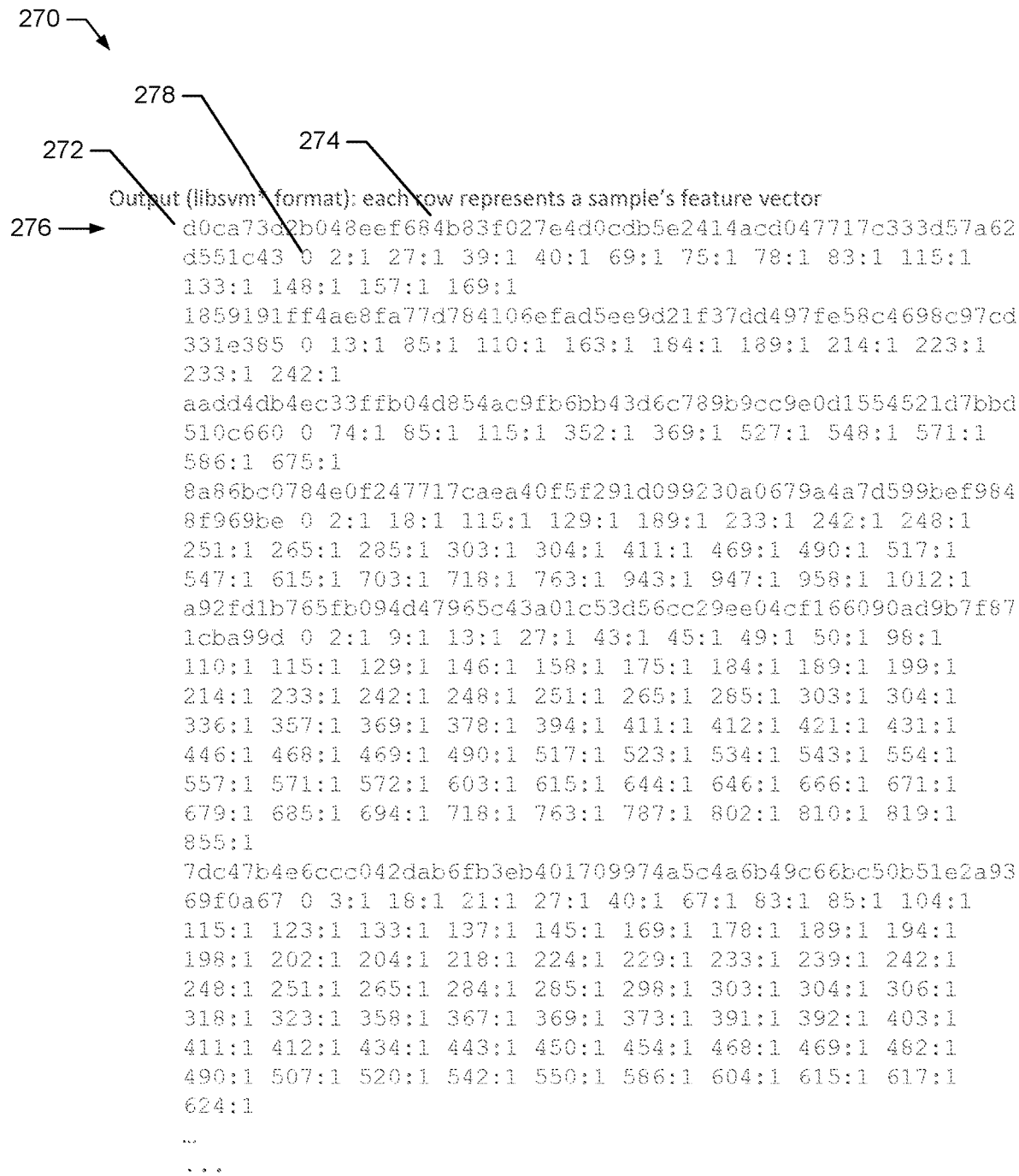
FIG. 2C is an example vector output file generated by the example computing environment of FIG. 1.

Traditional feature engineering techniques develop and apply separate vector creation programs that are unique to and/or otherwise customized for each type of log file that might be generated by respective behavior aggregators 102. The vector creation programs extract feature data from a respective log to create vectors to be used as a formatted input to a machine learning system 108, as shown in FIG. 1. As used herein, "vectors" are a collection of observed features associated with a program that has executed on a computing device, in which the program is identified with a unique hash value. FIG. 2C illustrates an example vector output file 270. In the illustrated example of FIG. 2C, the output file 270 includes rows, in which each program that has been observed to execute on a computing device is associated with a hash. A first hash value 272 of the example vector output file is shown in a first column 274 for a first row 276. A second column 278 illustrates an example dirty bit, in which a value of zero ("0") is indicative of clean execution by an example program (e.g., no observed malware) and a value of one ("1") is indicative of dirty execution by an example program.

Following the example second column 278 containing the example dirty bit, the example vector output file 270 includes any number of additional columns to identify which features occurred during execution of the example program associated with the hash 272. A first identified feature of the example first row 276 is "2:1," and a second identified feature is "27:1." Each numeric value prior to the colon (:) represents a unique feature. In particular, a dictionary lists features and associated vector values, thereby making the example vector output file 270 smaller and properly formatted as an input file to the example machine learning system 108. For example, the feature "getDeviceID" may be associated with vector value "2," and the feature "getInputStream" may be associated with vector value "27." In some examples, a value after the colon (:) represents a value associated with the feature. In the event a feature value is not needed or is of no consequence, the value may be set as one (1). The example output file 270 is shown in the illustrated example of FIG. 2C as a particular format associated with Library for Support Vector Machines (LIBSVM), but examples disclosed herein are not limited thereto.

In the event the example text log 250 of FIG. 2B is newly retrieved and/or otherwise received for the first time, an associated vector creation program is developed to accommodate for particular formatting and nomenclature of the log 250. Similarly, in the event the example text log 200 of FIG. 2A is newly retrieved and/or otherwise received for the first time, another associated vector creation program must be developed to accommodate for the particular specifications, formatting and/or other nuances of the newly retrieved log. As such, malware evaluation personnel chartered with the responsibility of researching malware behaviors must develop new vector creation programs as new and/or alternate behavior aggregators 102 emerge in the industry. Furthermore, in the event new features are developed by one or more programs, then the malware evaluation personnel must update any existing vector creation programs to accommodate for those new features, which may also include updating one or more dictionaries and/or regular expression string repositories. In some cases, a new feature type will emerge for multiple platforms, thereby requiring the malware evaluation personnel to apply and/or otherwise engineer updates to multiple different vector creation programs. Failure to properly apply updates may lead to bias and error when inconsistent data input is provided to the example machine learning system 108. Additionally, efforts by malware evaluation personnel to develop, update and maintain the one or more vector creation programs associated with different ones of the log files generated by different ones of the behavior aggregators 102 leads to inefficiency and/or lost productivity.

Examples disclosed herein improve feature engineering efficiency. Generally speaking, an example feature engineering system 110 retrieves one or more feature log files that may have been generated by one or more behavior aggregators 102 and converts and/or otherwise formats them into vectors (e.g., rows of feature vectors in a particular format compatible with the example machine learning system. Unlike traditional techniques for creating vector output files, which include disparate vector creation programs developed for each input data type, each program platform type and/or each program, the example feature engineering system 110 includes a single program to accommodate for any type of feature, feature nomenclature and/or file data type. As such, any updates and/or management in connection with new and/or alternate features or new and/or alternate feature nomenclature, the example feature engineering system 110 may be modified in a centralized manner to create updated unit operations, updated operation flow sequence(s), updated dictionary management and/or updated regular expression string management.

In the illustrated example of FIG. 1, the machine learning system(s) 108 and/or the feature engineering system 110 may be implemented with a big data framework platform 112. Generally speaking, amounts of aggregated data generated by the example computing devices 106 and evaluated by the example behavior aggregators 102 is large, in which such amounts of data are typically too large for file systems associated with standard operating systems (OSs). To accommodate data volumes associated with the example environment 100 of FIG. 1, the big data framework platform 112 may include a distributed file system, such as Hadoop®. In particular, Hadoop® is a distributed file system (sometimes referred to as the Hadoop Distributed File System (HDFS)) that enables storage and distribution of data throughout disparate networked storage locations, in which each storage location may be on the order of petabytes in size. In the event one or more additional storage locations is to be added or removed, the Hadoop® file system accommodates scalability functionality to handle a growing, shrinking and/or otherwise dynamic set of file storage locations. In some examples, the HDFS is installed on a Windows®-based server/platform or a Linux®-based server/platform.

Additionally, the example big data framework platform 112 may include one or more advanced analytics systems, such as Spark®. Unlike Hadoop®, which applies a MapReduce system to transfer large amounts of data to/from physical storage locations, Spark® utilizes relatively faster memory to perform one or more analytics on the available data. While Spark® still utilizes the underlying HDFS for storage at distributed locations, Spark® facilitates machine learning algorithms on large data sets, such as machine learning algorithms to identify patterns in the data. Additionally, Spark® includes computational features to scale additional platform resources when additional processing power is needed. Similar to Hadoop®, Spark® may be installed on a Windows®-based server/platform or a Linux®-based server/platform. While the above examples include Hadoop® and Spark® as candidate big data framework platforms 112, examples disclosed herein are not limited thereto. For example, other file systems may be included with examples disclosed herein, such as MongoDB, Amazon's S3 system, etc.

Figure 3:
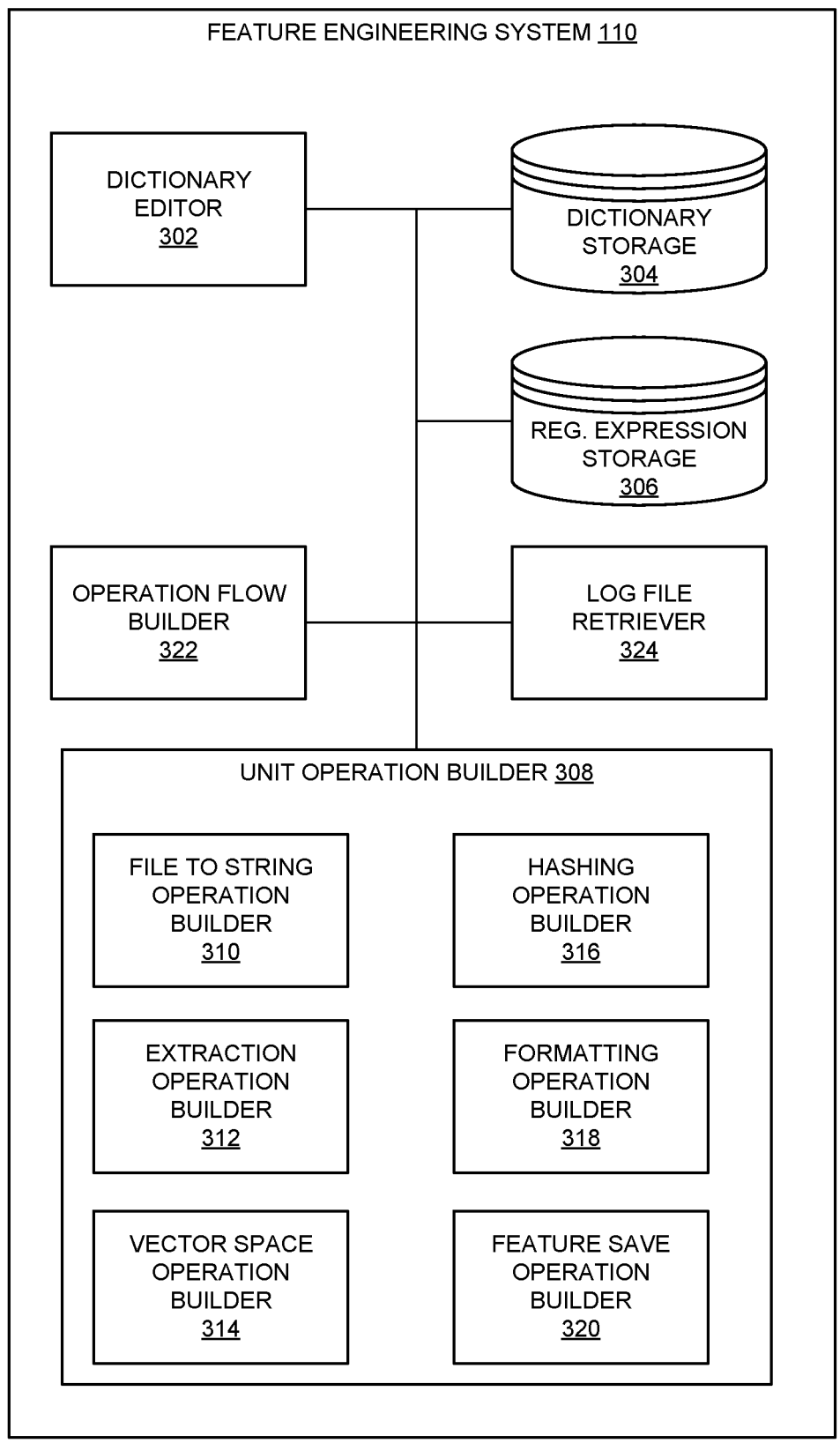
FIG. 3 is a schematic illustration of an example feature engineering system of FIG. 1.

FIG. 3 illustrates the example feature engineering system 110 of FIG. 1. In the illustrated example of FIG. 3, the feature engineering system 110 includes a dictionary editor 302 communicatively connected to a dictionary storage 304 and a regular expression storage 306. The example dictionary editor 302 may populate the example dictionary storage 304 and/or the example regular expression storage 306 to maintain parity with dictionary information and regular expression information that may be consistent with those utilized by the example machine learning system 108. In some examples, the dictionary storage includes information that associates particular feature nomenclature with an integer value, as described above. In still other examples, the dictionary storage includes alternate nomenclature for the same type of feature to allow feature nomenclature normalization when input logs by different behavior aggregators 102 refer to the same type of feature with different nomenclature. For example, a first behavior aggregator may refer to a feature associated with opening a network connection by using the nomenclature "OpenNetworkConn," while a second behavior aggregator may refer to a feature of the same functionality by using the nomenclature "Open TCP-Conn," while a third behavior aggregator may refer to a feature of the same functionality by using the nomenclature "OpenUDPConn." While all three of these disparate nomenclatures refers to the same program functionality, the example dictionary editor 302 updates the example dictionary storage 304 to create associations therebetween.

Additionally, the example dictionary storage 304 and the example regular expression storage 306 include one or more patterns of features and/or feature values to be identified during feature engineering of an input log of interest. In other words, search terms. For example, a translation unit operation (described in further detail below) may be used with a JSON log type and reference a target dictionary pattern "key1 key3." In particular, the JSON input may include any number and type of key, such as {"key1":"val1", "key2":"val2", "key3":"val3"}. Based on the target dictionary pattern "key1 key3," the resulting output based on the JSON log input is "val1, val3".

Additionally or alternatively, the example regular expression storage 306 may be invoked by the example dictionary editor 302 to apply search terms to the input log of interest. While the illustrated example dictionary editor 302 of FIG. 3 uses the term "dictionary," the example dictionary editor 302 may also access, use and/or modify operations of the example feature engineering system 110 using regular expressions exclusively or in combination with one or more dictionaries. Generally speaking, regular expressions include strings and/or sequences of defined characters to create one or more search patterns. The regular expression strings may include metacharacters indicative of Boolean operations, grouping operations, quantification operations, etc. For example, in the event electronic mail (e-mail) addresses are believed to be embedded in malware attempts, the example regular expression storage 306 may be modified and/or otherwise configured to include the regular expression "\b[A-Z0-9._%+-]+@[A-Z0-9.-]+\.[A-Z]{2,}\b". Utilization of the aforementioned regular expression allows the extraction of e-mail addresses from the candidate input log in a manner that is more agnostic to the input log type. For instance, the aforementioned regular expression may be used for JSON log file types, XML log file types and text log file types.

Returning to the illustrated example of FIG. 3, the feature engineering system 110 also includes a unit operation builder 308, which includes a file to string operation builder 310, an extraction operation builder 312, a vector space operation builder 314, a hashing operation builder 316, a formatting operation builder 318 and a feature save operation builder 320. The example feature engineering system 110 also includes an example operation flow builder 322 and an example log file retriever 324. In operation, the example feature engineering system determines whether to conduct configuration operations or whether a runtime scenario is occurring based on, for example, receipt of an input log from one or more behavior aggregators 102. For the sake of example, and assuming configuration operations are to occur based on, for example, a user prompt in view of a new input log type, the example dictionary editor updates the example dictionary storage 304 and/or updates the example regular expression string(s) stored in the example regular expression storage 306.

Updating the dictionary may include adding nomenclature associated with a log file received from a behavior aggregator 102, such as the example text log 200 of FIG. 2A and/or the example text log 250 of FIG. 2B. For the sake of example, if the retrieved and/or otherwise received log file 200 of FIG. 2A has never been received before, then some or all of the features therein may not yet be included in the example dictionary storage 304. The example dictionary editor 302 parses the retrieved log file for nomenclature to be added to the example dictionary storage 304 and, in some examples, one or more feature terms/nomenclature may be added manually (e.g., added by malware evaluation personnel). In some examples, the dictionary editor 302 populates the dictionary storage 304 with nomenclature terms and/or sequences of nomenclature terms. For example, to detect an occurrence of the feature "android.os.SystemProperties-.get," the example dictionary editor 302 may add a nomenclature string sequence to the example dictionary storage 304 to look for each of the desired terms of the target string of interest, such as "android" followed by "os" followed by "SystemProperties" followed by "get." Similarly, in the event regular expressions are to be used, the example dictionary editor 302 may develop expression search strings to identify the desired feature nomenclature.

In other examples, the dictionary editor 302 may generate nomenclature string terms to identify particular features of interest and/or particular calls to executables of interest. Returning to the illustrated example of FIG. 2B, the dictionary editor 302 may include a search string "popupkiller.exe" to identify instances of one or more features that invokes a particular executable of interest. As described above, while examples disclosed herein refer to example dictionaries (e.g., dictionary storage 304), such examples are not limited thereto and may be considered in connection with regular expression strings stored in the example regular expression storage 306.

While traditional approaches to handling the example text log 200 of FIG. 2A, the example text log 250 of FIG. 2B and/or one or more future logs (e.g., JSON logs, binary logs, etc.) required development of individualized vector creation programs to parse and extract log data into a vector output, examples disclosed herein facilitate a metadata-driven approach to processing retrieved and/or otherwise received log files without cumbersome and error prone development of individualized vector creation programs. As such, in the event a new feature is identified, or a new log data type is identified (e.g., a new plain text log file, a new comma separated value log file, a new JSON log file, etc.), examples disclosed herein facilitate a metadata-driven approach to handling new and/or modified input data types.

To facilitate the metadata-driven approach of feature engineering, the example unit operation builder 308 builds one or more unit operations in connection with a retrieved and/or otherwise received log (e.g., a log having a particular format (e.g., text, JSON, etc.) generated by an example behavior aggregator 102. As used herein, a unit operation is a metadata identifier (e.g., a tag) associated with one or more processing tasks of a log of interest. Unit operations may include functions/procedures such as, but not limited to, pattern matching, string replacement, string extraction (e.g., from a log file), string hashing, string translation, n-gram operation(s), pattern formatting, storage operation(s), etc. Table 1 below is an example list of candidate unit operations generated and/or modified by the example unit operation builder 308 of FIG. 3.

TABLE 1

| Op ID | Input/Output | Description |
|---|---|---|
| p01 | Filename/string | Convert a text file into one line of string text. |
| p02 | Filename, JSON paths/string | Convert JSON file into one line of string text. |
| m01 | String,pattern/string | Find matching unit by regular expression. |
| e01 | String,pattern/string | Extract substring from string by regular expression. |
| h01 | String,hash function/number | Hash a string or substring to a number. |
| t01 | String,mapping dictionary/string | Translate to different string from a dictionary. |
| n01 | String array, n-gram number/string array | N-Gram extraction. |
| f01 | Token array/string | Format to a particular type (e.g., LIBSVM). |
| s01 | Filename, string | Save features to vector file. |

In the illustrated example of Table 1, the example operation builder 308 generates a particular operation identifier (Op_ID) as a metadata tag that is associated with underlying functions/procedures to process a portion of a retrieved and/or otherwise received log file. For example, in the event a text-type log file is received by the example feature engineering system 110, then the example file to string operation builder 310 may generate an example unit operation named "p01" to convert that received text file into a string, thereby allowing further processing, as described below. Additionally, in the event a second log file is received by the example feature engineering system 110 that is of type JSON, then the example file to string operation builder 310 may generate an example unit operation named "p02" to convert that received JSON file into a string. In other words, regardless of the type of log file retrieved and/or otherwise received by the example feature engineering system 110, one or more unit operations may be generated by the example file to string operation builder 310 to accommodate for the input type (e.g., by applying known file structure standards of the file type, such as XML tag formatting, JSON formatting, text data, etc.).

Additionally, the example extraction operation builder 312 generates unit operation(s) to facilitate extraction, matching and/or translation of data from the retrieved log file. As described above, the example dictionary storage 304 and/or the example regular expression storage 306 may include one or more desired patterns that are to be searched when a log file is retrieved. In the illustrated example Table 1, a unit operation (Op_ID) named "m01" takes a string as an input (e.g., the string generated by the example "p01" unit operation) and a desired pattern of interest as an input defined by the example dictionary storage 304 or defined by the example regular expression storage 306, and generates an indication of a match when such a match of the desired pattern is detected. Additionally, the example extraction operation builder 312 generates a unit operation (Op_ID) named "e01" to extract a substring of the detected match.

In some examples, the extraction operation builder 312 generates a unit operation to find one or more strings based on a key list from the example dictionary storage 304 named "t01" (or named as metadata tag "t02," "t03," etc. depending on how many different log file types of interest are being handled). For example, the t01 unit operation tag may be associated with functionality that is particularly helpful for logs of type JSON to get values for features that may have similar nomenclature, but refer to the same type of feature. As described above, consider a feature that is related to opening a network connection. In some logs, this feature functionality is associated with the nomenclature "OpenTCPConn," while in other logs this functionality is associated with the nomenclature "OpenUDPConn," while in still other logs this functionality is associated with the nomenclature "OpenNetworkConn." As such, the example t01 unit operation generated by the example extraction operation builder 312 normalizes log feature nomenclature.

The example vector space operation builder 314 generates one or more unit operations to facilitate vector space analysis, such as, for example, n-gram unit operations. Generally speaking, n-grams reflect contiguous sequences of items (e.g., features). In some examples, a value for n is selected to identify a number of occurrences or a value associated with a sliding window for string conversion. In some examples, repeated features of frequency/occurrence n may be ignored when such occurrences are known and/or otherwise believed to be innocuous, thereby improving log file analysis efficiency.

The example hashing operation builder 316 generates unit operation(s) for hashing of feature types. Returning briefly to the illustrated example of FIG. 2C, the vector output file 270 represents observed features as different integer values. As described above, the observed feature "android.os.SystemProperties.get" may be represented as integer value 13, the observed feature to "CreateFileW" may be represented as integer value 39, and the observed feature to "CreateFileW" having an associated executable file name of "popupkiller.exe" may be represented as integer value 115. As such, the example hashing unit operation (e.g., metadata tag "h01") generated by the example hashing operation builder 316 reflects operations/functions to hash the observed features into particular integer values as defined by one or more dictionary definitions. As such, in the event a new feature is discovered that should be included in machine learning evaluation, a completely new vector creation program to extract the new feature does not have to be designed, coded and/or managed by the malware evaluation personnel. Instead, the corresponding dictionary of interest can be updated with the new feature name/type and a unique integer value for that feature may be assigned in the dictionary.

To prepare a vector output file that conforms to a format of interest, the example formatting operation builder 318 generates a unit operation for the target classification format of interest (e.g., metadata tag "f01"). In some examples, the machine learning system 108 must receive and/or otherwise retrieve input data in a particular format, such as LIBSVM. The example formatting operation builder 318 prepares the output log file (e.g., the example vector output file 270 of FIG. 2C) in a manner consistent with the desired classification format.

To save the vector output file upon completion of classification formatting efforts (e.g., in response to invoking metadata tag "f01"), the example feature save operation builder 320 generates an associated feature save unit operation that can be invoked by calling, for example, metadata tag "s01." When saved, the output vector file (e.g., the vector output file 270 of FIG. 2C) may be sent and/or otherwise transmitted to the example machine learning system 108.

After the example unit operation builder 308 has created and/or otherwise generated one or more unit operations having associated metadata tag names, one or more combinations of such unit operations may be assembled into particular sequences to process a received input log file of interest (e.g., the example text log 200 of FIG. 2A, the example text log 250 of FIG. 2B, an example JSON log, an example binary log, etc.). In operation, the example operation flow builder 322 builds one or more operation flow sequences for the input type of interest. In some examples, the example operation flow builder 322 generates a unique type identifier and a corresponding name to be referenced for future calls when processing the input log file of interest. Example operation flow sequences are shown in the illustrated example of Table 2 below.

TABLE 2

| Type ID | Name | Op ID Sequence | Other information |
|---|---|---|---|
| 1 | text | p01, m01*, e01*, n01, h01, f01, s01 | Pattern string for e01. |
| 2 | json | p02, m01*, t01*, n01, h01, f01, s01 | Dictionary for t01. |
| 3 | text2 | p01, m01*, e02*, n01, h01, f01, s01 | |

In the illustrated example of Table 2, the operation flow builder 322 associates a first Type_ID value of "1" with a sequence name "text." Additionally, the example operation flow builder 322 associates the Type_ID and name with a particular Op_ID sequence of interest, in which metadata tags are invoked in a particular order of "p01, m01, e01, n01, h01, f01 and s01." In the illustrated example of Table 2, an asterisk ("*") indicates that the functionality associated with the corresponding metadata tag is to be repeated as needed to accomplish a task (e.g., repeated in a loop to identify all nomenclature matches of interest from a dictionary). For example, the operation flow associated with Type_ID "1" loops the example unit operation "m01" to find one or more matches via regular expression string(s) and/or dictionary matches.

The example operation flow builder 322 establishes metadata sequence placement for file to string unit operation (e.g., assigning a metadata unit operation such as "p01"), followed by metadata sequence placement for extraction, matching and/or translation (e.g., assigning metadata unit operation(s) such as "e01," "m01," and/or "t01," respectively. The example operation flow builder 322 establishes metadata sequence placement for vector space analysis operation(s), such as metadata unit operation "n01", and establishes sequence placement for hashing operation(s) (e.g., metadata unit operation "h01"). The example operation flow builder 322 also establishes metadata sequence placement for target classification formatting operation(s) (e.g., metadata unit operation "f01"), and establishes metadata sequence placement for saving completed vector output files to a memory (e.g., metadata unit operation "s01").

In the event one or more additional and/or alternate input logs are known and/or otherwise available, the example feature engineering system 110 may (a) prepare dictionary storage 304 and regular expression storage 306 to accommodate for feature nomenclature to be used and/or otherwise expected in the log, (b) build one or more unit operations to handle the input log(s) (e.g., as described above in connection with example Table 1) and (c) build one or more operation flow sequences for input type(s) of interest (e.g., as described above in connection with example Table 2). However, during runtime, the example feature engineering system 110 may invoke the example log file retriever 324 to retrieve and/or otherwise receive an input log file (e.g., retrieve the log file from the example behavior aggregator 102 of FIG. 1). If the example log file retriever 324 does not recognize the retrieved log file type, then the example feature engineering system 110 operates in a configuration mode to (a) prepare the example dictionary storage 304 and/or regular expression storage 306 to accommodate for feature nomenclature to be used and/or otherwise expected in the log, (b) build one or more unit operations to handle the input log(s), and (c) build one or more operation flow sequences for input type(s) of interest.

On the other hand, in the event the example log file retriever 324 recognizes the log file type (e.g., a log file type of text that has an associated dictionary, regular expression string library, one or more unit operations and one or more operation flow sequence(s)), then the example operation flow builder 322 selects an appropriate operation flow sequence. For example, in the event the input log is associated with a first text type, then the example operation flow builder 322 identifies a matching "text" name and the associated Type_ID "1" to extract the correct operation flow sequence for the input log of interest. In this example, the corresponding operation flow sequence is "p01, m01*, e01, n01, h01, f01 and s01." On the other hand, in the event the retrieved log file type is associated with "json," then the example operation flow builder 322 retrieves operation flow sequence associated with Type_ID "2."

The example dictionary editor 302 retrieves and/or otherwise identifies corresponding dictionaries and/or regular expression string(s) that are associated with the selected operation flow sequence, and the example operation flow builder 322 executes the corresponding operation flow sequence to process the input log file. When complete, the example feature engineering system 110 has a stored output file, such as the example output vector file 270 of FIG. 2C, which may be sent to a vector feature analyzer, such as the example machine learning system 108 of FIG. 1.

While an example manner of implementing the feature engineering system 110 of FIG. 1 is illustrated in FIGS. 1 and 3, one or more of the elements, processes and/or devices illustrated in FIG. 3 may be combined, divided, re-arranged, omitted, eliminated and/or implemented in any other way. Further, the example dictionary editor 302, the example dictionary storage 304, the example regular expression storage 306, the example unit operation builder 308, the example file to string operation builder 310, the example extraction operation builder 312, the example vector space operation builder 314, the example hashing operation builder 316, the example formatting operation builder 318, the example feature save operation builder 320, the example operation flow builder 322, the example log file retriever 324 and/or, more generally, the example feature engineering system 110 of FIGS. 1 and 3 may be implemented by hardware, software, firmware and/or any combination of hardware, software and/or firmware. Thus, for example, any of the example dictionary editor 302, the example dictionary storage 304, the example regular expression storage 306, the example unit operation builder 308, the example file to string operation builder 310, the example extraction operation builder 312, the example vector space operation builder 314, the example hashing operation builder 316, the example formatting operation builder 318, the example feature save operation builder 320, the example operation flow builder 322, the example log file retriever 324 and/or, more generally, the example feature engineering system 110 of FIGS. 1 and 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example dictionary editor 302, the example dictionary storage 304, the example regular expression storage 306, the example unit operation builder 308, the example file to string operation builder 310, the example extraction operation builder 312, the example vector space operation builder 314, the example hashing operation builder 316, the example formatting operation builder 318, the example feature save operation builder 320, the example operation flow builder 322, the example log file retriever 324 and/or, more generally, the example feature engineering system 110 of FIGS. 1 and 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example feature engineering system 110 of FIGS. 1 and/or 3 may include one or more elements, processes and/or devices in addition to, or instead of, those illustrated in FIG. 3, and/or may include more than one of any or all of the illustrated elements, processes and devices.

Figure 4:
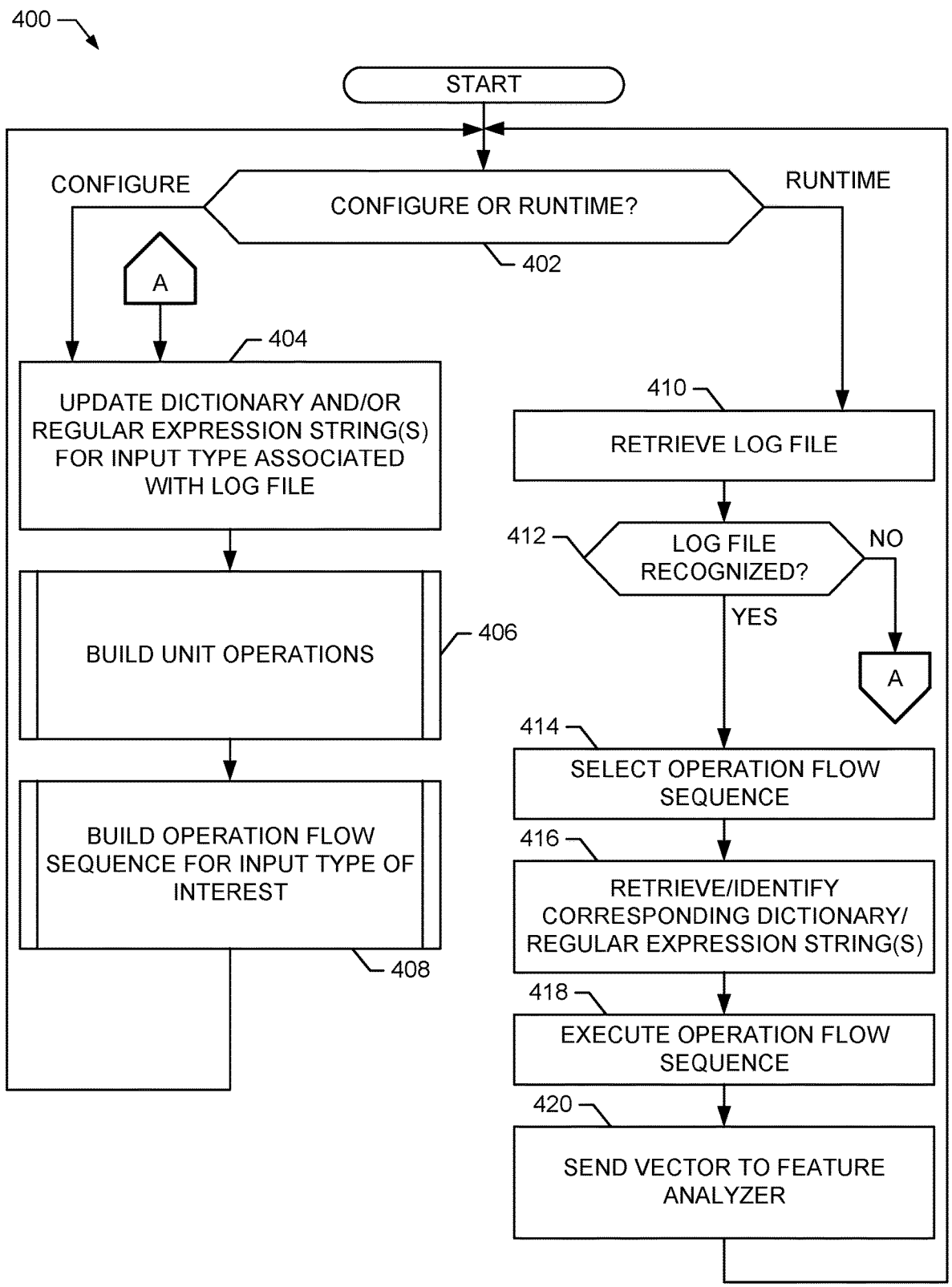
FIGS. 4-6 are flowcharts representative of example machine readable instructions that may be executed to implement the example feature engineering system of FIGS. 1 and/or 3.
Figure 5:
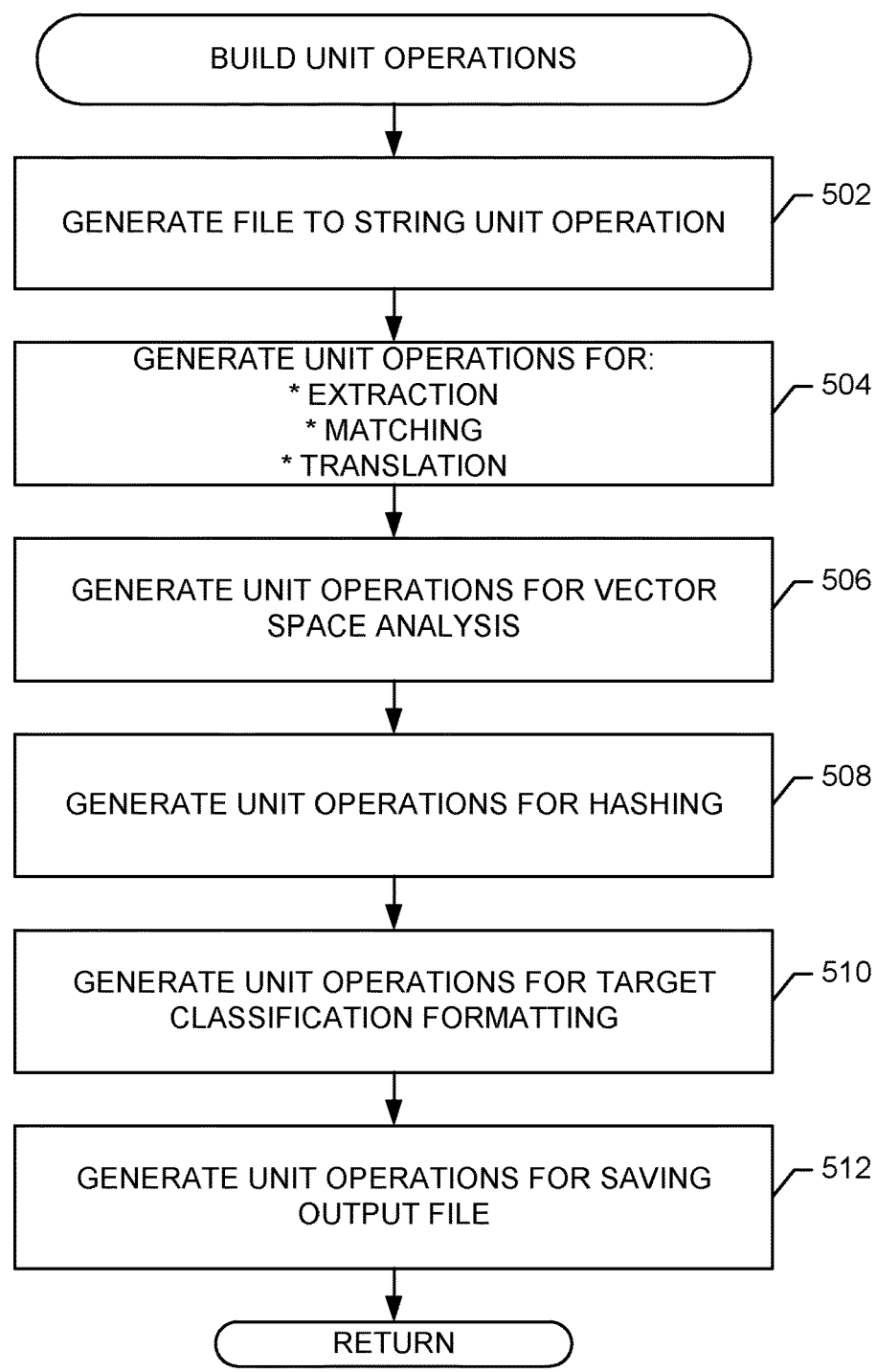
Figure 6:
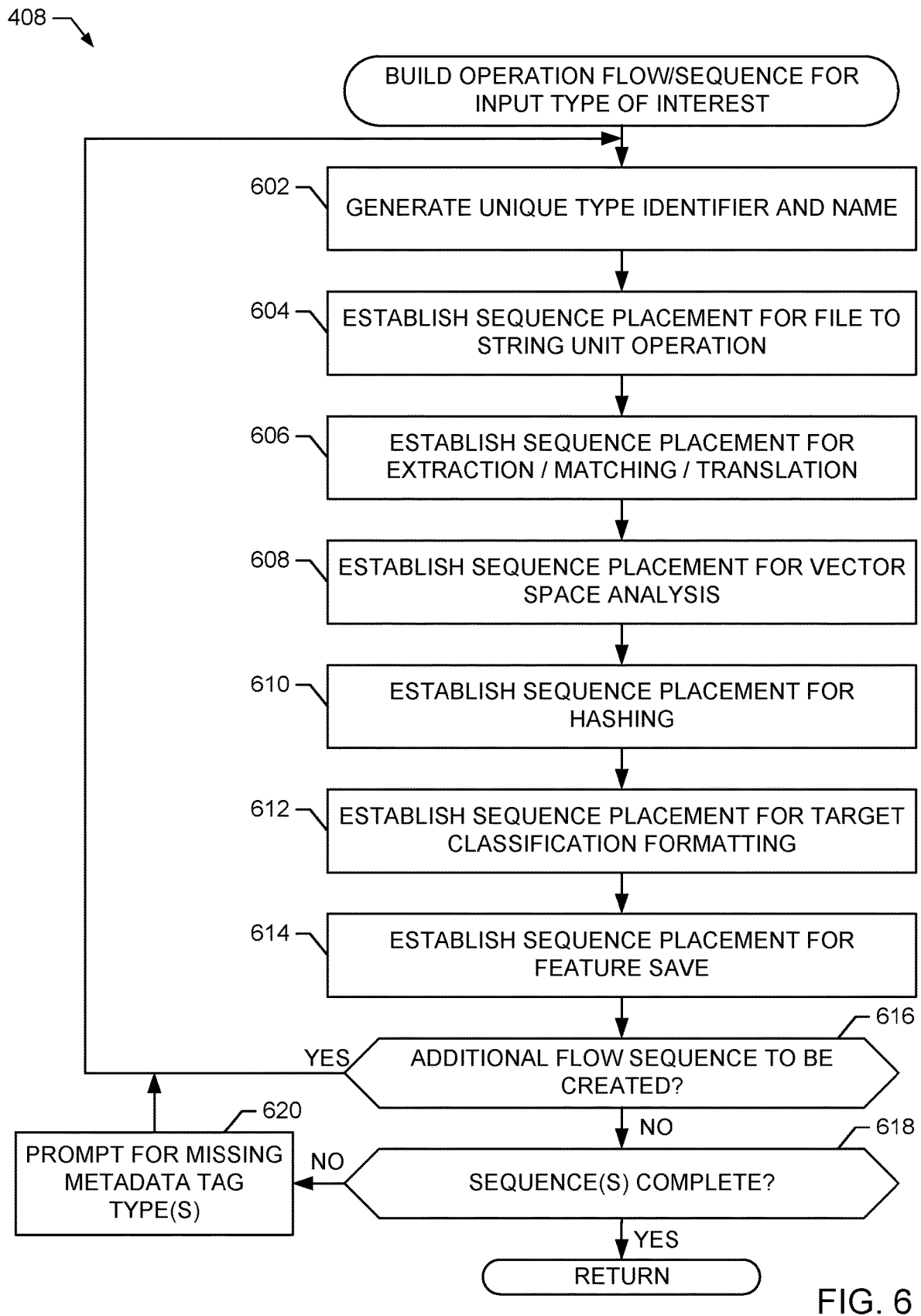

Flowcharts representative of example machine readable instructions for implementing the feature engineering system 110 of FIGS. 1 and 3 are shown in FIGS. 4-6. In these examples, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 4-6, many other methods of implementing the example feature engineering system 110 may alternatively be used. For example, the order of execution of the blocks may be changed, and/or some of the blocks described may be changed, eliminated, or combined.

As mentioned above, the example processes of FIGS. 4-6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 400 of FIG. 4 begins at block 402, where the example feature engineering system 110 determines whether to operate in a manner that facilitates configuration to handle input log file types, or whether to operate in a runtime manner that processes retrieved and/or otherwise received input log file types. In the event the example feature engineering system 110 is to configure itself to be prepared to a particular input log file type (block 402), the example dictionary editor 302 updates the example dictionary storage 304 and/or the example regular expression storage 306 with feature nomenclature definitions, feature nomenclature combination(s) and/or corresponding regular expression string(s) associated with the input log type of interest (block 404). As described above, the example dictionary editor 302 may parse a newly received input log file for new nomenclature and/or nomenclature combinations and set corresponding dictionary definitions and/or regular expression strings to extract such indications of feature occurrences.

For example, the dictionary editor 302 may retrieve the example text log 200 of FIG. 2A and set a first feature name as "android.os.SystemProperties.get" to be associated with a previously unused list of integers (block 404). As described above, the example vector output file 270 includes a vector list, in which every unique feature has an associated unique integer representation. The example dictionary editor 302 assigns the newly identified feature to a next available integer value so that any future reference to the feature may be associated with that uniquely assigned integer value. In other examples, the dictionary editor determines which two or more occurrences of nomenclature are to be associated with a feature instance. For example, a combination of the term "lava" plus "net" plus "Socket" can refer to several different features that include a concatenated string "java.net.Socket." However, the example dictionary editor 302 only assigns a feature if the aforementioned substring is also appended with another term, such as "getInputStream" to indicate a feature occurrence associated with input stream retrieval in a socket communication. In another example, the example dictionary editor 302 assigns an alternate feature in response to detecting the appended nomenclature "getOutputStream" to indicate a feature occurrence associated with output stream retrieval in a socket communication. As described above and in further detail below, the example unit operation builder 308 generates a metadata tag and associated operational functionality to parse an input string to find one or more occurrences of features (block 406), such as occurrences of "java.netSocketgetInputStream" and/or "java.net.Socket.getOutputStream."

The example unit operation builder 308 builds unit operations to be associated with the input log of interest (block 406). FIG. 5 illustrates additional detail associated with building unit operations (block 406) of FIG. 4. While the illustrated example of FIG. 5 considers a "top down" approach to building unit operations, examples are not limited thereto. In some examples, respective ones of the operation(s) of FIG. 5 may be invoked, as needed. For instance, one or more portions of FIG. 5 may be invoked to accomplish respective operations during one or more subsequent iteration(s). In the illustrated example of FIG. 5, the example file to string operation builder 310 generates a file to string unit operation (block 502) to convert the log file of interest to a string. For example, the file to string operation builder 310 may assign a tag named "p01" with operations (e.g., string manipulation code) to convert each row of the log file to a string, which can later be evaluated by one or more other operations for extraction, matching, hashing, etc., as described above and in further detail below. When the example log file of interest has been converted to a string (block 502), the example extraction operation builder 312 generates one or more unit operations and associated metadata tags to extract one or more expressions of interest (block 504). As described above, the extraction operation builder 312 may generate a metadata tag named "m01" to find a matching feature using regular expression string(s) stored in the example regular expression storage 306, and/or identify matching feature(s) by referencing the example dictionary storage 304. Without limitation, the example extraction operation builder 312 may generate a metadata tag named "e01" to extract one or more particular substrings. In some examples, slightly different nomenclature in the candidate/target input log file refers to similar features, for which the example extraction operation builder 312 may normalize via a metadata tag named "t01" associated with translation logic, as described above.

The example vector space operation builder 314 generates a unit operation for vector space analysis (block 506), such as operations that employ n-gram logic associated with a metadata tag named "n01." The example hashing operation builder 316 generates a unit operation to facilitate hashing (block 508), such as operations to hash and/or otherwise associate one or more features into an integer representation. As described above, the example vector output file 270 represents each feature as a unique integer value, associations for which may be stored in the example dictionary storage 304 to be assigned during hashing operation(s) (block 508). The example formatting operation builder 318 generates a unit operation for formatting a vector output file into a classification intended for a target analysis effort (block 510), such as efforts performed by the example machine learning system 108 of FIG. 1. One example format is the LIBSVM format, but examples disclosed herein are not limited thereto. The example formatting operation builder 318 may assign a metadata tag for this operation, such as "f01." To facilitate saving the vector output file, the example feature save operation builder 320 generates a unit operation for saving an output file (block 512). In some examples, the feature save operation builder 320 assigns a metadata tag name "s01" that may be called as part of a metadata tag sequence, as described above and below. Control then returns to block 408 of FIG. 4.

Returning to the illustrated example of FIG. 4, the example feature engineering system 110 now has unit operations that are tailored and/or otherwise unique to a particular input log of interest. Such unit operations may be called by referencing their associated metadata tag nomenclature into a particular sequence to build a vector output file (e.g., the vector output file 270 of FIG. 2C) that can be provided to one or more machine learning systems (e.g., the example machine learning system 108 of FIG. 1). The example operation flow builder 322 builds one or more operation flow sequences for the input log of interest (block 408).

In the illustrated example of FIG. 6, the operation flow builder 322 generates a unique type identifier and associated name for the input log of interest (block 602). As described above in connection with Table 2, each input log of interest may have one or more operation flow sequences for which each candidate sequence is assigned an associated name (e.g., "text" to refer to an input log of type text data, "json" to refer to an input log of type JSON data, etc.) and an associated Type_ID. The example operation flow builder 322 initially establishes a sequence placement metadata tag for a file to string unit operation (block 604), such as "p01" to invoke operations related to converting the input log of type text into a string for later processing. Such metadata tags may be sequenced, assembled and/or otherwise built via a user interface or a text editor, in which the malware evaluation personnel can edit. With the data from the input log in a string format, the example operation flow builder 322 establishes sequence to facilitate one or more of feature extraction, feature matching and/or feature translation (block 606). For example, the input log may utilize one or more dictionaries that are accessed by operational logic in response to calling the metadata tag "m01." The called metadata tag may operate in a loop as many times as needed to search through the string for matching ones of features identified in the example input log (sometimes signified by an asterisk ("*")). In some examples, the operation flow builder 322 facilitates one or more sequence placements for vector space analysis (block 608), such as operations to perform n-grams.

The example operation flow builder 322 establishes a sequence to facilitate hashing operation(s) (block 610), which allow the relatively long feature description nomenclature to be represented by unique integer values. Because each target machine learning system may have a particular classification input format needed for machine learning activity, the example operation flow builder 322 establishes a sequence to facilitate target classification formatting (block 612). As described above, one example classification format includes LIBSVM, but examples disclosed herein are not limited thereto. To allow saving a vector output file, the example operation flow builder 322 establishes sequence placement for a feature save operation (block 614) (e.g., "s01").

In some examples, the malware evaluation personnel may attempt to build one or more vector output files that utilize alternate sequences of metadata-driven operations. For example, some input log files may require different combinations of extraction, matching and/or translation that utilize one or more dictionaries and/or regular expression string(s). In the event one or more additional flow sequence(s) are to be created (block 616), control returns to block 602. The example operation flow builder 322 also verifies that an assembled sequence is complete (block 618). For example, in the event the malware evaluation personnel created the assembled sequence by editing a text file of one or more metadata tags, the example operation flow builder 322 verifies that one or more metadata tags is not missing (e.g., the malware evaluation personnel did not select a metadata tag to perform feature matching). If one or more metadata tags is deemed missing (block 618), the example operation flow builder 322 generates a prompt that the sequence includes one or more errors or missing metadata tags (block 620), and control is advanced to a respective block to identify which metadata tag should be added and/or otherwise checked (e.g., one or more of blocks 604-614).

Returning to the illustrated example of FIG. 4, the example feature engineering system 110 may also operate in a runtime mode (block 402). If so, the example log file retriever 324 retrieves and/or otherwise receives an input log file (block 410) and determines if the received input log file is recognized (block 412). For instance, a new input log file may have been received that had not previously been evaluated during a configuration mode of the example feature engineering system 110. If so, control advances to block 404 to configure the feature engineering system 110 in view of the previously unseen input log file.

If the received and/or otherwise retrieved input log file is recognized (block 412), the example operation flow builder 322 selects an operation flow sequence that is associated with the input log file of interest (block 414). In some examples, the operation flow builder 322 analyzes the input log file to determine a type of "text," "json," etc. Additionally, the example operation flow builder 322 selects a candidate operation flow sequence for that particular input log file type so that metadata tags associated therewith can be executed in their particular sequential order. The example dictionary editor 302 retrieves and/or otherwise identifies corresponding dictionaries (e.g., one or more dictionaries stored in the example dictionary storage 304) and/or corresponding regular expression string(s) (e.g., one or more regular expression string(s) stored in the example regular expression storage 306) (block 416). The example operation flow builder 322 executes the selected operation flow sequence (block 418) based on the combination of metadata tags associated with that selected flow sequence to generate a vector output file, such as the example vector output file 270 illustrated in FIG. 2C. Once the vector output file has been created, the example feature engineering system 110 sends the vector output file to one or more feature analyzer(s) (block 420), such as the example machine learning system 108 of FIG. 1.

Figure 7:
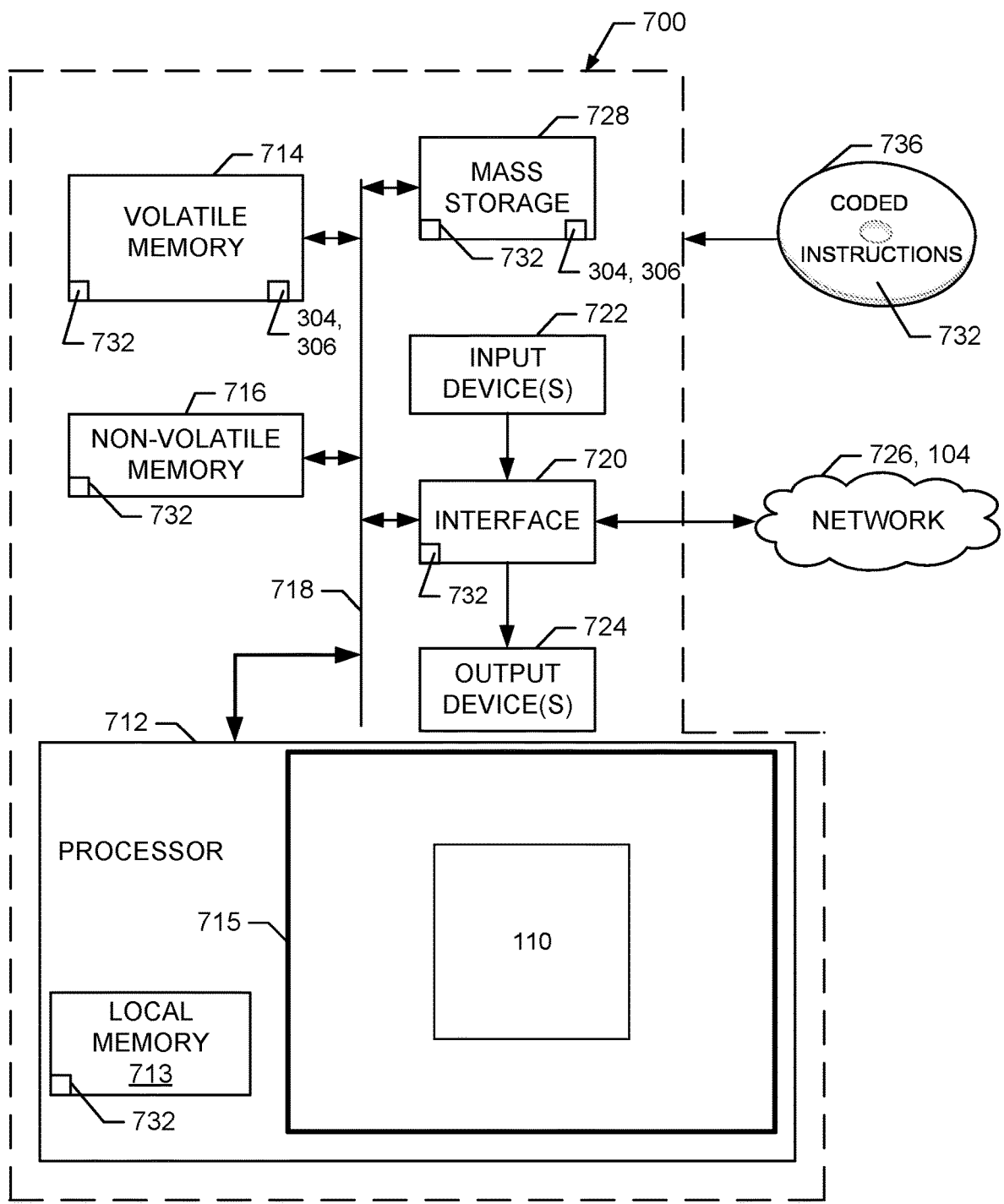
FIG. 7 is a block diagram of an example processor platform structured to execute the example machine readable instructions of FIGS. 4-6 to implement the example feature engineering system of FIGS. 1 and/or 3.

FIG. 7 is a block diagram of an example processor platform 700 capable of executing the instructions of FIGS. 4-6 to implement the feature engineering system 110 of FIGS. 1 and 3. The processor platform 700 can be, for example, a server, a personal computer, an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer. In the illustrated example of FIG. 7, the processor 700 includes one or more example processing cores 715 configured via example instructions 732, which include the example instructions of FIGS. 4-6 to implement the example feature engineering system 110 of FIGS. 1 and/or 3.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives. In some examples, the mass storage device 728 may implement the example dictionary storage 304 and/or the example regular expression storage 306.

The coded instructions 732 of FIGS. 4-6 may be stored in the mass storage device 728, in the volatile memory 714, in the non-volatile memory 716, and/or on a removable tangible computer readable storage medium such as a CD or DVD.

Example methods, apparatus, systems and articles of manufacture to improve feature engineering efficiency with metadata unit operations are disclosed herein. Further examples and combinations thereof include the following.

Example 1 is a computer-implemented method to apply feature engineering with metadata-driven unit operations, including retrieving a log file in a first file format, the log file containing feature occurrence data, generating a first unit operation based on the first file format to extract the feature occurrence data from the log file to a string, the first unit operation associated with a first metadata tag, generating second unit operations to identify respective features from the feature occurrence data, the second unit operations associated with respective second metadata tags, and generating a first sequence of the first metadata tag and the second metadata tags to create a first vector output file of the feature occurrence data.

Example 2 includes the method as defined in example 1, wherein the first unit operation includes parsing operations for at least one of a text file format, a comma separated value (CSV) file format, a JavaScript Object Notation (JSON) file format, or a binary file format.

Example 3 includes the method as defined in example 1, further including building a dictionary of feature nomenclature associated with the respective features from the feature occurrence data.

Example 4 includes the method as defined in example 3, further including generating search substrings of the feature nomenclature.

Example 5 includes the method as defined in example 4, wherein respective ones of the second unit operations identify the search substrings as feature occurrence instances.

Example 6 includes the method as defined in example 1, further including executing the first sequence of the first metadata tag and the second metadata tags to create the first vector output file associated with the first file format, and executing a second sequence of the first metadata tag and alternate ones of the second metadata tags to create a second vector output file associated with the first file format.

Example 7 includes the method as defined in example 6, wherein the second metadata tags invoke a dictionary to identify feature occurrence instances, and the alternate ones of the second metadata tags invoke regular expressions to identify feature occurrence instances.

Example 8 includes the method as defined in claim 1, wherein respective ones of the second unit operations extract feature instances based on at least one of dictionary matching or regular expression strings.

Example 9 includes the method as defined in example 1, wherein respective ones of the second unit operations normalize feature nomenclature based on a dictionary association.

Example 10 includes the method as defined in example 1, wherein respective ones of the second unit operations hash identified features to a unique integer value.

Example 11 includes the method as defined in example 1, wherein respective ones of the second unit operations format the vector output file based on a Library for Support Vector Machines (LIBSVM) classification format.

Example 12 is an apparatus to apply feature engineering with metadata-driven unit operations, comprising a log file retriever to retrieve a log file in a first file format, the log file containing feature occurrence data, a file to string operation builder to generate a first unit operation based on the first file format to extract the feature occurrence data from the log file to a string, the first unit operation associated with a first metadata tag, an extraction operation builder to generate second unit operations to identify respective features from the feature occurrence data, the second unit operations associated with respective second metadata tags, and an operation flow builder to generate a first sequence of the first metadata tag and the second metadata tags to create a first vector output file of the feature occurrence data.

Example 13 includes the apparatus as defined in example 12, wherein the file to string operation builder is to generate parsing operations for at least one of a text file format, a comma separated value (CSV) file format, a JavaScript Object Notation (JSON) file format, or a binary file format.

Example 14 includes the apparatus as defined in example 12, further including a dictionary editor to build a dictionary of feature nomenclature associated with the respective features from the feature occurrence data.

Example 15 includes the apparatus as defined in example 14, wherein the extraction operation builder is to generate search substrings of the feature nomenclature.

Example 16 includes the apparatus as defined in example 15, wherein the search substrings identify respective ones of the second unit operations as feature occurrence instances.

Example 17 includes the apparatus as defined in example 12, wherein the operation flow builder is to execute the first sequence of the first metadata tag and the second metadata tags to create the first vector output file associated with the first file format, and execute a second sequence of the first metadata tag and alternate ones of the second metadata tags to create a second vector output file associated with the first file format.

Example 18 includes the apparatus as defined in example 17, wherein the second metadata tags invoke a dictionary to identify feature occurrence instances, and the alternate ones of the second metadata tags invoke regular expressions to identify feature occurrence instances.

Example 19 includes the apparatus as defined in example 12, further including a dictionary editor to facilitate extraction of feature instances from respective ones of the second unit operations based on at least one of dictionary matching or regular expression strings.

Example 20 includes the apparatus as defined in example 12, further including a dictionary editor to normalize respective ones of the second unit operations to identify feature nomenclature based on a dictionary association.

Example 21 includes the apparatus as defined in example 12, further including a hashing operation builder to hash respective ones of the second unit operations to a unique integer value.

Example 22 includes the apparatus as defined in example 12, further including a formatting operation builder to format the vector output file based on a Library for Support Vector Machines (LIBSVM) classification format.

Example 23 is a tangible computer readable storage medium comprising computer readable instructions which, when executed, cause a processor to at least retrieve a log file in a first file format, the log file containing feature occurrence data, generate a first unit operation based on the first file format to extract the feature occurrence data from the log file to a string, the first unit operation associated with a first metadata tag, generate second unit operations to identify respective features from the feature occurrence data, the second unit operations associated with respective second metadata tags, and generate a first sequence of the first metadata tag and the second metadata tags to create a first vector output file of the feature occurrence data.

Example 24 includes the computer readable storage medium of example 23, wherein the instructions, when executed, cause the processor to generate parsing operations for at least one of a text file format, a comma separated value (CSV) file format, a JavaScript Object Notation (JSON) file format, or a binary file format.

Example 25 includes the computer readable storage medium of example 23, wherein the instructions, when executed, cause the processor to build a dictionary of feature nomenclature associated with the respective features from the feature occurrence data.

Example 26 includes the computer readable storage medium of example 25, wherein the instructions, when executed, cause the processor to generate search substrings of the feature nomenclature.

Example 27 includes the computer readable storage medium of example 26, wherein the instructions, when executed, cause the processor to identify, from respective ones of the second unit operations, the search substrings as feature occurrence instances.

Example 28 includes the computer readable storage medium of example 23, wherein the instructions, when executed, cause the processor to execute the first sequence of the first metadata tag and the second metadata tags to create the first vector output file associated with the first file format, and execute a second sequence of the first metadata tag and alternate ones of the second metadata tags to create a second vector output file associated with the first file format.

Example 29 includes the computer readable storage medium of example 28, wherein the instructions, when executed, cause the processor to invoke, via the second metadata tags, a dictionary to identify feature occurrence instances, and the alternate ones of the second metadata tags invoke regular expressions to identify feature occurrence instances.

Example 30 includes the computer readable storage medium of example 23, wherein the instructions, when executed, cause the processor to extract, from respective ones of the second unit operations, feature instances based on at least one of dictionary matching or regular expression strings.

Example 31 includes the computer readable storage medium of example 23, wherein the instructions, when executed, cause the processor to normalize, from respective ones of the second unit operations, feature nomenclature based on a dictionary association.

Example 32 includes the computer readable storage medium of claim 23, wherein the instructions, when executed, cause the processor to hash, from respective ones of the second unit operations, identified features to a unique integer value.

Example 33 includes the computer readable storage medium of example 23, wherein the instructions, when executed, cause the processor to format, from respective ones of the second unit operations, the vector output file based on a Library for Support Vector Machines (LIBSVM) classification format.

Example 34 is a system to apply feature engineering with metadata-driven unit operations, comprising means for retrieving a log file in a first file format, the log file containing feature occurrence data, means for generating a first unit operation based on the first file format to extract the feature occurrence data from the log file to a string, the first unit operation associated with a first metadata tag, means for generating second unit operations to identify respective features from the feature occurrence data, the second unit operations associated with respective second metadata tags, and means for generating a first sequence of the first metadata tag and the second metadata tags to create a first vector output file of the feature occurrence data.

Example 35 includes the system as defined in example 34, further including means for generating parsing operations for at least one of a text file format, a comma separated value (CSV) file format, a JavaScript Object Notation (JSON) file format, or a binary file format.

Example 36 includes the system as defined in example 34, further including means for building a dictionary of feature nomenclature associated with the respective features from the feature occurrence data.

Example 37 includes the system as defined in example 36, further including means for generating search substrings of the feature nomenclature.

Example 38 includes the system as defined in example 37, further including means for identifying respective ones of the second unit operations as feature occurrence instances.

Example 39 includes the system as defined in example 34, further including means for executing the first sequence of the first metadata tag and the second metadata tags to create the first vector output file associated with the first file format, and executing a second sequence of the first metadata tag and alternate ones of the second metadata tags to create a second vector output file associated with the first file format.

Example 40 includes the system as defined in example 39, further including means for invoking a dictionary to identify feature occurrence instances, and the alternate ones of the second metadata tags invoke regular expressions to identify feature occurrence instances.

Example 41 includes the system as defined in example 34, further including means for facilitating extraction of feature instances from respective ones of the second unit operations based on at least one of dictionary matching or regular expression strings.\

Example 42 includes the system as defined in example 34, further including means for normalizing respective ones of the second unit operations to identify feature nomenclature based on a dictionary association.

Example 43 includes the system as defined in example 34, further including means for hashing respective ones of the second unit operations to a unique integer value.

Example 44 includes the system as defined in example 34, further including a formatting operation builder to format the vector output file based on a Library for Support Vector Machines (LIBSVM) classification format.

From the foregoing, it will be appreciated that the above disclosed methods, apparatus and articles of manufacture reduce a need to develop and maintain disparate programs for each type of file format that may be generated by behavior aggregators that are chartered with the responsibility of collecting feature behavior associated with programs executing on computing devices. In particular, traditional techniques to generate vector output files suitable for machine learning systems required the development of unique file parsing programs depending on each file format type, such as output files from the behavior aggregators as text files, JSON files, CSV files and/or binary files. In the event a new type of feature having a new nomenclature is identified, then malware evaluation personnel needed to identify each corresponding program and modify it to accommodate for the new nomenclature and/or new combinations of existing nomenclature. Such management and maintenance efforts are error prone and require duplicative efforts on all file extraction programs under their control. Examples disclosed herein reduce such duplicative efforts and reduce potential maintenance errors by facilitating a metadata-driven approach to log file processing in which a dictionary can be used as a repository for feature nomenclature, feature nomenclature combinations, and metadata tags to invoke log file processing operations in a centralized manner.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   interface circuitry to receive a plurality of files from a plurality of devices different than the apparatus;
   machine readable instructions; and
   one or more processor circuits to execute the machine readable instructions to:
      determine respective first formats of the plurality of files, the plurality of files to be used to create a plurality of vector output files;
      convert the plurality of files from the respective first formats to a second format, conversion of respective files based on the determination of the respective first formats of the plurality of files;
      extract respective features from the respective files of the plurality of files, the respective files in the second format;
      identify at least one respective group of contiguous characters in the respective features;
      create the plurality of vector output files, respective vector output files including columns, respective columns including at least one number representative of an occurrence of the respective features; and
      cause a machine learning algorithm to detect malware observed in at least one file of the plurality of files by outputting the plurality of vector output files to the machine learning algorithm, the plurality of vector output files formatted to be processed by the machine learning algorithm, the machine learning algorithm to analyze the respective features to detect the malware.

2. The apparatus of claim 1, wherein the plurality of files is representative of a plurality of potentially malicious files.

3. The apparatus of claim 1, wherein the respective features extracted from the respective files are represented by respective portions of the respective files in the respective first formats, and the respective features include respective strings.

4. The apparatus of claim 1, wherein the plurality of vector output files includes a plurality of feature vectors representative of a plurality of potentially malicious files, respective potentially malicious files identified by respective hash values.

5. The apparatus of claim 1, wherein the one or more processor circuits are to execute the machine readable instructions to identify respective numbers of occurrences of a window of characters in the respective features.

6. The apparatus of claim 1, wherein the respective columns of the respective vector output files correspond to unique features.

7. The apparatus of claim 1, wherein the plurality of devices are first devices, and the machine learning algorithm is to be executed by a second device.

8. A non-transitory computer readable medium comprising instructions that, when executed, cause one or more processors to:
   determine respective first formats of a plurality of files, the plurality of files retrieved from a plurality of devices, the plurality of files to be used to create a plurality of vector output files;
   convert the plurality of files from the respective first formats to a second format, conversion of respective files based on the determination of the respective first formats of the plurality of files;
   extract respective features from the respective files of the plurality of files, the respective files in the second format;
   identify at least one respective group of contiguous characters in the respective features;
   create the plurality of vector output files, respective vector output files including columns, respective columns including at least one character representative of an occurrence of the respective features; and
   cause a machine learning algorithm to detect malware observed in at least one file of the plurality of files by outputting the plurality of vector output files to the machine learning algorithm, the plurality of vector output files formatted to be processed by the machine learning algorithm, the machine learning algorithm to analyze the respective features to detect the malware.

9. The non-transitory computer readable medium of claim 8, wherein the plurality of files is representative of a plurality of potentially malicious files.

10. The non-transitory computer readable medium of claim 8, wherein the respective features extracted from the respective files are represented by respective portions of the respective files in the respective first formats, and the respective features include respective strings.

11. The non-transitory computer readable medium of claim 8, wherein the plurality of vector output files include a plurality of feature vectors representative of a plurality of potentially malicious files, respective potentially malicious files identified by respective hash values.

12. The non-transitory computer readable medium of claim 8, wherein the instructions, when executed, cause the one or more processors to identify respective numbers of occurrences of a window of characters in the respective features.

13. The non-transitory computer readable medium of claim 8, wherein the respective columns of the respective vector output files correspond to unique features.

14. The non-transitory computer readable medium of claim 8, wherein the plurality of devices are first devices, and the machine learning algorithm is to be executed by a second device.

15. A method comprising:
   determining, by executing one or more instructions with one or more processors, respective first formats of a plurality of files, the plurality of files retrieved from a plurality of devices, the plurality of files to be used to create a plurality of vector output files;
   converting, by executing one or more instructions with the one or more processors, the plurality of files from the respective first formats to a second format, conversion of respective files based on the determination of the respective first formats of the plurality of files;
   extracting, by executing string manipulation code with the one or more processors, respective feature from the respective files of the plurality of files, the respective files in the second format;

identifying, by executing one or more instructions with the one or more processors, at least one respective group of contiguous characters in the respective features;

creating the plurality of vector output files, respective vector output files including columns, respective columns including at least one indicia representative of an occurrence of the respective features; and causing a machine learning algorithm to detect malware observed in at least one file of the plurality of files by outputting the plurality of vector output files to the machine learning algorithm, the plurality of vector output files formatted to be processed by the machine learning algorithm, the machine learning algorithm to analyze the respective features to detect the malware.

16. The method of claim 15, wherein the plurality of files is representative of a plurality of potentially malicious files.

17. The method of claim 15, wherein the respective features extracted from the respective files are represented by respective portions of the respective files in the respective first formats, and the respective features include respective strings.

18. The method of claim 15, wherein the plurality of vector output files include a plurality of feature vectors representative of a plurality of potentially malicious files, respective potentially malicious files identified by respective hash values.

19. The method of claim 15, further including identifying respective numbers of occurrences of a window of characters in the respective features.

20. The method of claim 15, wherein the respective columns of the respective vector output files correspond to unique features.

21. The method of claim 15, wherein the plurality of devices are first devices, and the machine learning algorithm is to be executed by a second device.

\* \* \* \* \*